United States Patent [19]
Mahurin

[11] Patent Number: 6,151,616
[45] Date of Patent: Nov. 21, 2000

[54] METHOD AND CIRCUIT FOR DETECTING OVERFLOW IN OPERAND MULTIPLICATION

[75] Inventor: Eric W. Mahurin, Austin, Tex.

[73] Assignee: Advanced Micro Devices, Inc., Sunnyvale, Calif.

[21] Appl. No.: 09/057,271

[22] Filed: Apr. 8, 1999

[51] Int. Cl.[7] .................................. G06F 7/38; G06F 7/52
[52] U.S. Cl. ............................................. 708/552; 708/620
[58] Field of Search .................................... 708/498, 503, 708/552, 497, 551, 500, 670, 700

[56] References Cited

U.S. PATENT DOCUMENTS

| | | | |
|---|---|---|---|
| 5,122,981 | 6/1992 | Taniguchi | 708/497 |
| 5,138,570 | 8/1992 | Argade | 708/552 |
| 5,390,134 | 2/1995 | Heikes et al. | 708/497 |
| 5,539,685 | 7/1996 | Otazuro | 708/552 |
| 5,671,171 | 9/1997 | Yu et al. | 708/500 |
| 5,745,397 | 4/1998 | Nadehara | 708/700 |

*Primary Examiner*—Tan V. Mai
*Attorney, Agent, or Firm*—Kevin L. Daffer; Conley, Rose & Tayon

[57] ABSTRACT

Disclosed is a method and circuit for detecting overflow when multiplying operands. The disclosed method and circuit is configured to operate in parallel with a multiplier configured to multiply first and second n bit operands. In general, the multiplier circuit generates result operand which represents a multiplication of the first and second n bit operands. An overflow detection circuit is coupled to the multiplier circuit and configured to generate an overflow signal which indicates that the multiplication of the first and second n bit operands results in an overflow condition. The multiplier circuit comprises a compression circuit configured to generate the first and second 2n bit partial product operands as a function of the first and second n bit operands. An addition of the first and second 2n bit partial product operands produces the result operand. The multiplier circuit also includes a carry generation circuit configured to generate at least one carry bit representing a carry value of adding the (n−1) least significant bits of the first and second 2n bit partial product operands. The carry bit along with the most significant (n+1) bits of the first and second 2n bit partial product operands are provided to the overflow detection circuit. In response, the overflow detection circuit is configured to generate the overflow signal as a function of the carry bit and the most significant (n+1) bits of the first and second 2n bit partial product operands.

20 Claims, 3 Drawing Sheets

METHOD AND CIRCUIT FOR DETECTING OVERFLOW IN OPERAND MULTIPLICATION

BACKGROUND OF THE INVENTION

1. Field of the Invention

This invention relates to the field of integrated circuits in general, and to a method and circuit for detecting an overflow condition during multiplication of operands in particular.

2. Description of the Relevant Art

Microprocessors determine the speed and power of personal computers and a growing number of more powerful machines. Microprocessors handle most of the data processing in the machine in which they are installed. Microprocessors typically include at least three functional groups: the input output unit (I/O), the control unit, and the arithmetic logic unit (ALU). The I/O unit interfaces between external circuitry and the ALU and the control unit. I/O units frequently include signal buffers for increasing the current capacity of a signal before the signal is sent to external components. The control unit controls the operation of the microprocessor by fetching instructions from the I/O unit and translating the instructions into a form that can be understood by the ALU. In addition, the control unit keeps track of which step of a given program is being executed. The ALU handles the mathematical computations and logical operations that are performed by the microprocessor. The ALU executes the decoded instructions received from the control unit to modify data contained in registers within the microprocessor.

An essential component of an ALU is the multiplication circuit. The multiplication circuit typically performs multiplication operations on at least two input operands. Often times the multiplication of two operands will result in an overflow condition. Generally, overflow occurs when the result of the multiplication does not fit the representation being used.

Overflow in multiplication can occur in signed or unsigned operations. With respect to unsigned operations, overflow occurs when the product of two n bit operands exceeds n bits. Stated another way, if any of the n most significant bits of the 2n bit product result operand equals logical one, then an overflow condition occurs. With respect to signed operations, an overflow condition occurs if any of the n most significant bits of the 2n bit product result operand does not equal the $n^{th}$ least significant bit (e.g., the sign bit) of the result operand.

FIG. 1 shows a prior art overflow detection circuit 10 coupled to a multiplier circuit 12. Multiplier circuit 12 is configured to receive two n bit operands $a_{n-1:0}$ and $b_{n-1:0}$. Multiplier circuit 12 is configured to generate a result operand ($r_{2n-1:0}$) up to two n bits in length as a function of the input operands $a_{n-1:0}$ and $b_{n-1:0}$. With respect to unsigned multiplication, overflow detection circuit analyzes the n most significant bits of $r_{2n-1:n-1}$ to determine whether any is a logical one. With respect to signed operand multiplication, overflow detection circuit 10 checks the n+1 bits of $r_{2n-1:n-1}$ to determine whether they are all equal. Overflow detection circuit 10 generates a signal indicating overflow if either of the two conditions arise.

Because multiplication and overflow detection is one of the most commonly invoked operations during the execution of the computer program, the speed with which the circuit shown in FIG. 1 operates is extremely important in determining the overall speed of the system. As can be seen in FIG. 1 multiplier circuit 12 and overflow detection circuit 10 operate sequentially. In other words, overflow detection circuit 10 does not operate to detect overflow until the n or n+1 (depending upon whether overflow is being checked in a signed or unsigned operation) most significant bits of result operand $r_{2n-1:0}$ are available from multiplier circuit 12. The sequential nature of operation of the circuit shown in FIG. 1 adds delay to the overall operation of microprocessor employing the same. It would therefore be desirable to produce a multiplier circuit with overflow detection that achieves a significant reduction in time required to produce results.

SUMMARY OF THE INVENTION

The problems identified above are in large part addressed by a multiplier circuit having an overflow detection circuit coupled thereto, which operates in parallel therewith. The multiplier circuit is provided for multiplying first and second n bit operands. The multiplier circuit generates a result operand, where the result operand represents a multiplication of the first and second n bit operands. The overflow detection circuit is coupled to the multiplier circuit and configured to generate an overflow signal in parallel with the generation of the result operand, where the overflow signal indicates that the multiplication of the first and second n bit operands results in an overflow condition.

In one embodiment, the overflow condition results when the result operand exceeds n bits. In another embodiment, the overflow condition occurs when the result operand includes m bits, wherein m is greater than n, and the (m−n) most significant bits of the result operand do not equal bit n of the result operand.

In another embodiment of the present invention the multiplier circuit comprises a compression circuit configured to generate first and second 2n bit partial product operands as a function of the first and second n bit operands. An addition of the first and second 2n bit partial product operands produces the result operand. The multiplier circuit in this embodiment also includes a carry generation circuit configured to generate at least one carry bit representing a carry value of adding the (n−1) least significant bits of the first and second 2n bit partial product operands. The carry bit along with the most significant (n+1) bits of the first and second two n bit partial product operands are provided to the overflow detection circuit. In response, the overflow detection circuit is configured to generate the overflow signal as a function of the carry bit and the most significant (n+1) bits of the first and second 2n bit partial product operands.

One advantage of the present invention is that it detects overflow when multiplying two n bit operands.

Another advantage of the present invention is that it detects overflow when multiplying two signed operands.

Yet another advantage of the present invention is that it detects overflow when multiplying two unsigned operands.

Still another advantage of the present invention is that it detects overflow in signed or unsigned multiplication operations and generates the overflow detection signal in parallel with the multiplication operation.

BRIEF DESCRIPTION OF THE DRAWINGS

Other objects and advantages of the invention will become apparent upon reading the following detailed description and upon reference to the accompanying drawings in which.

Figure 1:
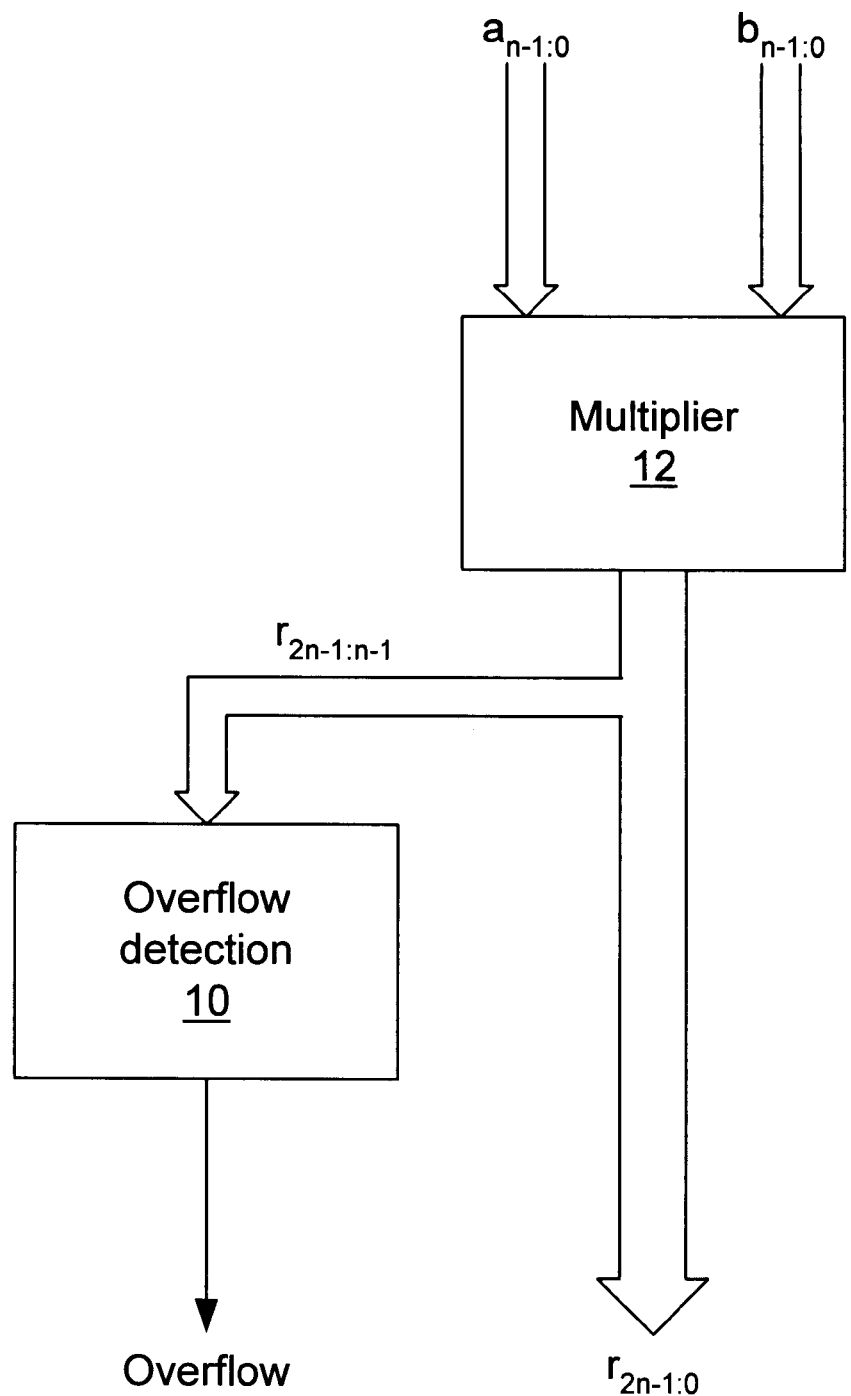
FIG. 1 is a block diagram showing a prior art multiplication circuit operating in serial with an overflow detection circuit.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 2:
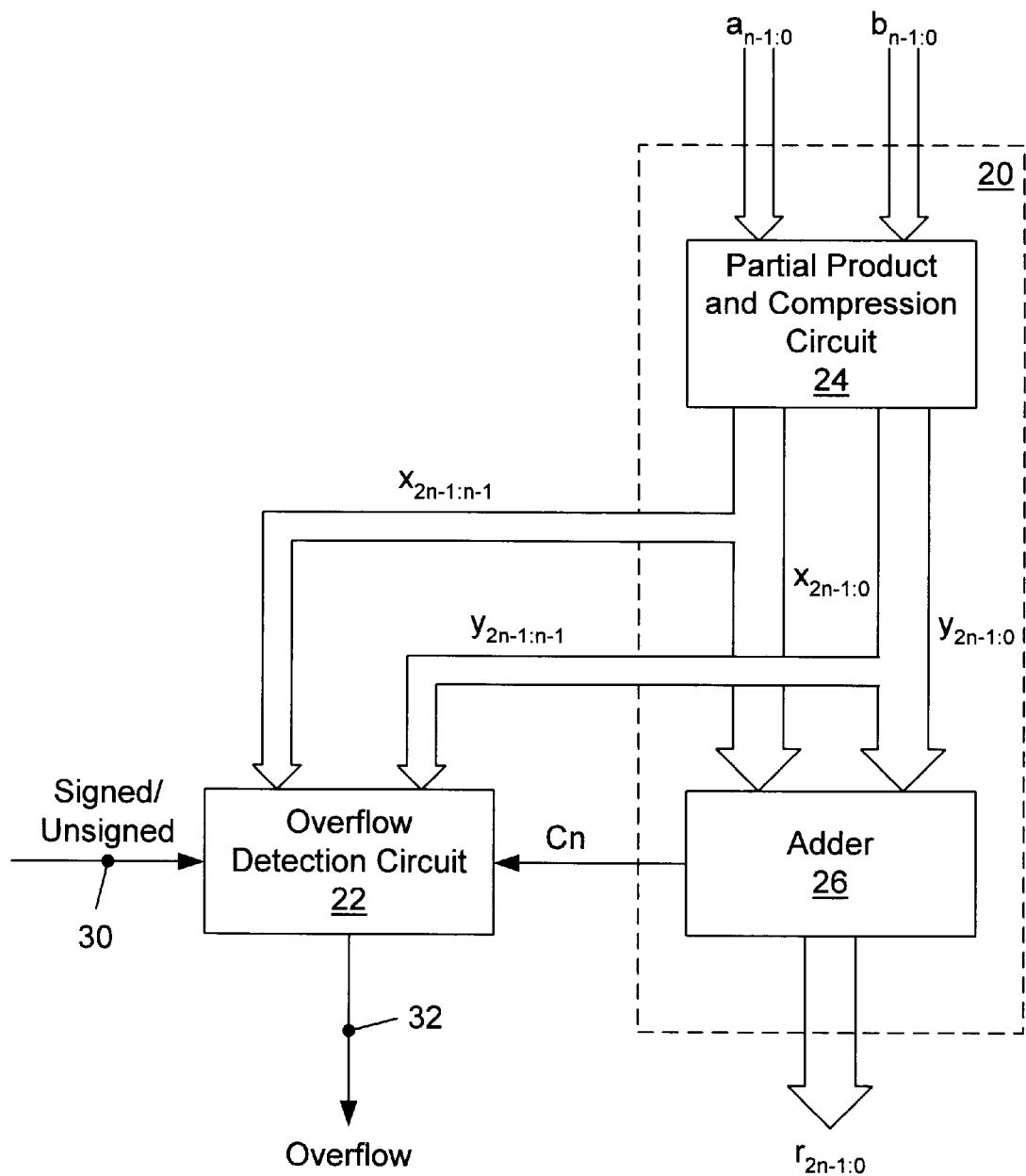
FIG. 2 is a block diagram of a multiplication circuit and overflow detection circuit operating in accordance with the present invention.

FIG. 2 is a block diagram of a circuit employing one embodiment of the present invention. The circuit includes a multiplier circuit 20 coupled to an overflow detection circuit 22. Multiplier circuit 20 includes a partial product and compression circuit 24 coupled to an adder 26. Partial product and compression circuit 24 is configured to receive first and second n bit operands $a_{n-1:0}$ and $b_{n-1:0}$, respectively. The partial product and compression circuit, in one embodiment, employs a wallace tree, which is well known to those of ordinary skill in the art, and generates n partial products which in turn are compressed down to first and second partial products $x_{2n-1:0}$ and $y_{2n-1:0}$, respectively. Adder 26 is configured to receive and add the first and second partial products $x_{2n-1:0}$ and $y_{2n-1:0}$ and to generate a result operand $r_{2n-1:0}$. Adder 26 is configured to generate carry bits during the addition of the first and second partial product operands. It is noted that a product of two n bit operands $a_{n-1:0}$ and $b_{n-1:0}$ can produce a result operand which can occupy up to 2n bits.

Overflow detection circuit 22 is configured to receive the (n+1) most significant bits of the first and second partial product operands (i.e., $x_{2n-1:n-1}$ and $y_{2n-1:n-1}$) and the (n+1) most significant carry bit (i.e., $c_n$) generated by adder 26. Overflow detection circuit 22 is coupled to signed/unsigned control node 30 which is configured to receive a signed/unsigned control signal. Overflow detection circuit is configured to generate an overflow signal indicating that the result of multiplying the first and second operands $a_{n-1:0}$ and $b_{n-1:0}$, does not fit in the representation being used. For example, if the first and second operands are each four bits wide and are designated unsigned operands, overflow detection circuit 22 will generate an overflow signal at its output node 32 if any of the four most significant bits of the result operand $r_{2n-1:0}$ equate to logical one. Additionally, if the first and second operands $a_{n-1:0}$ and $b_{n-1:0}$ are each four bits wide and are designated signed operands, overflow detection circuit 22 will generate an overflow signal at output node 32 if each of the four most significant bits of the result operand $r_{2n-1:0}$ does not equate to the fourth least significant bit (i.e., the sign bit) of the result operand.

Overflow detection circuit 22 receives a first or second signed/unsigned control signal at control node 30 when partial product and compression circuit 24 receives the first and second operands $a_{n-1:0}$ and $b_{n-1:0}$. One of the first or second signed/unsigned control signals is provided to overflow detection circuit 22 depending on the type of first and second operands $a_{n-1:0}$ and $b_{n-1:0}$ provided to partial product and compression circuit 24. In particular, overflow detection circuit 22 receives the first signed/unsigned control signal (e.g., logical one) when partial product and compression circuit 24 is provided with signed first and second operands $a_{n-1:0}$ and $b_{n-1:0}$. Overflow detection circuit 22 receives the second signed/unsigned control signal (e.g., logical zero) when unsigned first and second operands $a_{n-1:0}$ and $b_{n-1:0}$ are provided to partial product and compression circuit 24.

In response to receiving the signed/unsigned control signal, the (n+1) most significant bits of the first and second partial product operands $x_{2n-1:0}$ and $y_{2n-1:0}$, and carry bit $c_n$, overflow detection circuit 22 generates a signal at overflow output node 32 indicating whether first and second input operands $a_{n-1:0}$ and $b_{n-1:0}$ produce an overflow result when multiplied together. It is noted that overflow detection circuit 22 operates in parallel with adder 26 such that the overflow signal provided at node 32 is generated as result operand $r_{2n-1:0}$ is generated. In other words, overflow detection circuit 22 produces overflow signal at output node 32 as adder 26 is adding the first and second partial products to produce the result operand. Accordingly, generation of the overflow signal at output node 32 is not dependent upon or does not sequentially follow the generation of the result operand $r_{2n-1:0}$. This provides the benefit of reducing the time required to generate the result operand and overflow signal.

Figure 3:
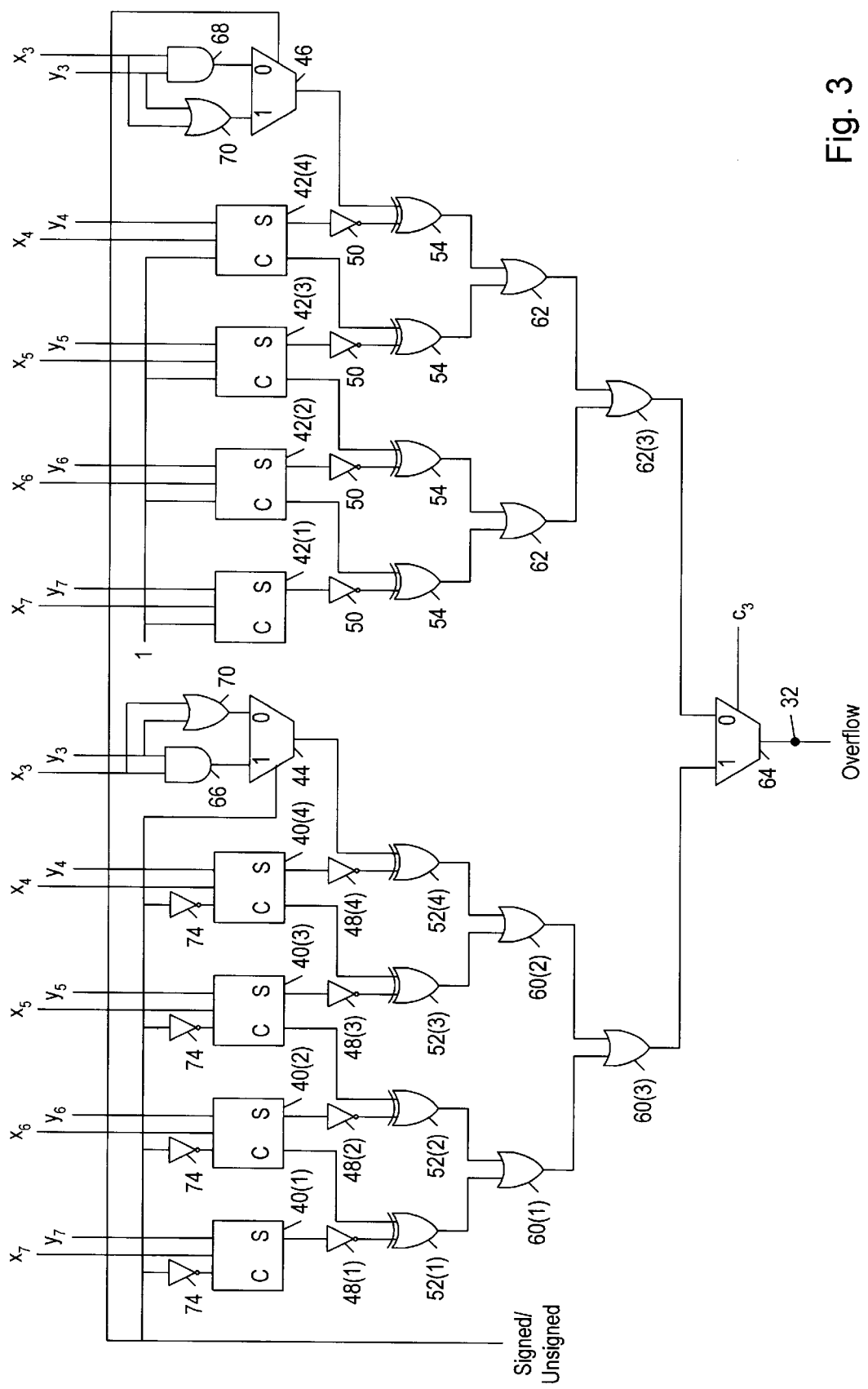
FIG. 3 is a schematic diagram of the overflow detection circuit shown in FIG. 2.

FIG. 3 is a schematic diagram of one embodiment of the overflow detection circuit 10 shown in FIG. 2. In this embodiment, overflow detection circuit 10 includes a first set of full adders 40, a second set of full adders 42, first and second multiplexers 44 and 46, first and second sets of inverters 48 and 50, first and second sets of XOR gates 52 and 54, first and second sets of OR gates 60 and 62, carry select multiplexer 64, first and second AND gates 66 and 68, first and second OR gates 70 and 72, and a set of inverters 74.

The overflow detection circuit 10 shown in FIG. 3 is configured for operation in connection with a multiplier circuit for multiplying four bit first and second operands to produce a result which can be up to eight bits. However, the present invention should not be limited thereto. Rather, the present invention has application with multiplier circuits configured for multiplying first and second operands of a greater or lesser number of bits. Moreover, the overflow detection circuit 10 can be applied in connection with circuits which are configured for arithmetic operations other than multiplication.

Each of the full adders 40 has three inputs and a pair of outputs. Two inputs of each adder 40 are configured to receive corresponding bits of the four most significant bits (i.e., $x_{7:4}$ and $y_{7:4}$) of the first and second partial product operands $x_{2n-1:0}$ and $y_{2n-1:0}$. The remaining input of each full adder 40 is coupled to the output of an inverter 74 which in turn is coupled to the signed/unsigned control node 30. Each full adder 40 further includes a sum output designated S and a carry output designated C. The sum output of each full adder 40 is coupled to the input of a corresponding inverter 48 which in turn is coupled to an input of corresponding XOR gate 52. With the exception of full adder 40(1), the carry output of each full adder 40 is coupled to an adjacent XOR gate 52 as shown in FIG. 3. Additionally, output of multiplexer 44 is coupled to one of the inputs of XOR gate 52(4). OR gates 60(1) and 60(2) have a pair of inputs coupled to receive the outputs of XOR gates 52 as shown in FIG. 3. The outputs of OR gate 60(1) and 60(2) are coupled to the inputs of OR gate 60(3) whose output, in turn, is coupled to one of the inputs of multiplexer 64. The outputs of AND gate 66 and OR gate 72 are coupled to the inputs of multiplexer 44. Multiplexer 44 further includes a select control input which is coupled to signed/unsigned control node 30. AND gate 66 and OR gate 72 have a pair of inputs coupled to receive $x_3$ and $y_3$, respectively.

Each of the full adders 42 has three inputs and a pair of outputs. Two inputs of each adder 42 are configured to receive corresponding bits of the four most significant bits (i.e., $x_{7:4}$ and $y_{7:4}$) of the first and second partial product operands $x_{2n-1:0}$ and $y_{2n-1:0}$. The remaining input of each fill adder 42 is coupled to a voltage representative of logical one. Each full adder 42 further includes a sum output designated S and a carry output designated C. The sum output of each full adder 42 is coupled to the input of a corresponding inverter 50 which in turn is coupled to an input of corresponding XOR gate 54. With the exception of full adder 42(1), the carry output of each full adder 42 is coupled to an adjacent XOR gate 54 as shown in FIG. 3. Additionally, output of multiplexer 46 is coupled to one of the inputs of XOR gate 54(4). OR gates 62(1) and 62 (2) have a pair of inputs coupled to receive the outputs of XOR gates 54 as shown in FIG. 3. The outputs of OR gate 62(1) and 62(2) are coupled to the inputs of OR gate 62(3) whose output, in turn, is coupled to one of the inputs of multiplexer 64. The outputs of AND gate 68 and OR gate 72 are coupled to the inputs of multiplexer 46. Multiplexer 46 further includes a select control input which is coupled to signed/unsigned control node 30. AND gate 66 and OR gate 72 each have a pair of inputs coupled to receive $x_3$ and $y_3$, respectively.

Multiplexer 64 includes an output coupled to overflow output node 32 and a selection control input node configured to receive $c_3$ from adder circuit 26 (not shown in FIG. 3). When carry bit $c_3$ is logical one, carry select multiplexer 64 passes the signal provided by OR gate 60(3). When carry bit $c_3$ is a logical zero, carry select multiplexer 64 operates to pass the signal provided by OR gate 62(3).

In operation, a logical one will be generated as the overflow signal at overflow output node 32 in one or two situations. Namely, where the first and second four bit operands $a_{3:0}$ and $b_{3:0}$ are signed operands, a logical one will be generated as the overflow signal when:

$$x_{7:4}+y_{7:4}+x_3 y_3+(x_3, Vy_3)c_3 \neq x_3 \oplus y_3 \oplus c_3 \quad (1)$$

where V represents a logical OR operation and where $\oplus$ represents a logical XOR operation. If the first and second operands represent unsigned operands, then a logical one will be generated at overflow output node 32 when:

$$x_{7:4}+y_{7:4}+x_3 y_3+(x_3 V y_3)c_3 \neq 0 \quad (2)$$

FIG. 3, including its operation to detect overflow in signed or unsigned multiplication, can best be understood in connection with the following expressions. More particularly, the result operand $r_{7:0}$ generated by adder 26 of FIG. 2 is represented as an addition of the first and second eight bit partial product operands $x_{7:0}$ and $y_{7:0}$ as follows:

$$\begin{array}{r} c_8 c_7 c_6 c_5 c_4 c_3 c_2 c_1 \\ x_7 x_6 x_5 x_4 x_3 x_2 x_1 x_0 \\ + y_7 y_6 y_5 y_4 y_3 y_2 y_1 y_0 \\ \hline r_7 r_6 r_5 r_4 r_3 r_2 r_1 r_0 \end{array} \quad (3)$$

It is noted that $c_{8:1}$ represents the carry bits when adding first and second partial product operands $x_{7:0}$ and $y_{7:0}$. With respect to unsigned multiplication of four bit first and second operands, one of ordinary skill in the art will recognize that the four most significant bits of result operand $r_{7:4}$ will be zero if there is no overflow condition. In contrast an overflow occurs when:

$$r_{7:4}=r_7 r_6 r_5 r_4 \neq 0 \quad (4)$$

One of ordinary skill in the art will also recognize that $r_{7:4}$ can be represented as a function of $x_{7:4}$, $y_{7:4}$, and $c_4$. Namely:

$$r_{7:4}=x_{7:4}+y_{7:4}+c_4 \quad (5)$$

Addition of binary numbers to generate a sum and carry is well known in the art. In particular, $$s_i = x_i \oplus y_i \quad (6)$$

$$r_i = s_i \oplus c_i = x_i \oplus y_i \oplus c_i \quad (7)$$

$$c_{i+1} = x_i y_i V(x_i V y_i) c_i, \quad (8)$$

where $s_i$ represents the sum of adding $x_i$ and $y_i$, $r_i$ represents the sum of adding $x_i$, $y_i$, and $c_i$, and $c_{i+1}$ represents the carry resulting from the sum of $x_i$, $y_i$, and $c_i$. Often times $r_i$ and $c_{i+1}$ are referred to as the result of a three to two compression of $x_i$, $y_i$, and $c_i$.

If $c_3$ equals logical zero, it follows that Equation 8 reduces to:

$$c_4 = x_3 y_3 \quad (9)$$

Equations 4, 5 and 9 above when combined produces:

$$x_{7:4}+y_{7:4}-1+1+x_3 y_3 \neq 0 \quad (10)$$

It is noted that the +1 and −1 in Equation 10 cancel each other thereby maintaining consistency. Further, it is noted that the two's complement notation of −1 can be expressed as follows:

$$-1=-0001=1111 \quad (11)$$

As an aside a logical one is inputted to each of the full adders 42 as a result of the addition of the +1 within Equation 10 as will be more fully described below. One of ordinary skill in the art will recognize that:

$$x_{7:4}+y_{7:4}-1=s_{7:4}+c_{7:5},0 \quad (12)$$

Where $c_{7:5},0$ represents a concatenation of $c_{7:5}$ and logical zero. Given Equation 12, it is easily seen that Equation 10 reduces to:

$$s_{7:4}+c_{7:5},0+x_3 y_3+1 \neq 0 \quad (13)$$

In two's complement notation, a negative integer can be expressed as follows:

$$-z_{x:y}=\bar{z}_{x:y}+1 \quad (14)$$

As a result $s_{7:4}$ when added to 1 reduces to the following:

$$s_{7:4}+1=-\bar{s}_{7:4} \tag{15}$$

Substituting Equation 15 into Equation 13 and rearranging the terms with respect to the unequal signs, it follows that:

$$c_{7:5},0+x_3y_3 \neq \bar{s}_{7:4} \tag{16}$$

and $$c_{7:5},x_3y_3 \neq \bar{s}_{7:4} \tag{17}$$

FIG. 3 implements Equation 17. Namely, the inverted sum outputs of full adders 42 are compared with the carry outputs of full adders 42 (2)–(4) and the result of ANDing $x_3$ and $y_3$, via XOR gates 54, when a logical zero is provided to signed/unsigned control node 30. If the corresponding values are not equal, a logical one will be provided at output node 32, indicating an overflow condition.

FIG. 3 implements Equation 17 when $c_3$ equals logical zero. If however $c_3$ equals a logical one then Equation 8 above produces the following for $c_4$:

$$c_4=x_3Vy_3 \tag{18}$$

A combination of Equations 18 and 5 results in the following expression:

$$x_{7:4}+x_{7:4}+(x_3Vy_3) \neq 0 \tag{19}$$

Again, adding +1 and −1 to Equation 19 and combining it with Equation 12 above results in the following:

$$s_{7:4}+c_{7:5},0+(x_3Vy_3)+1 \neq 0 \tag{20}$$

As noted above $s_{7:4}+1$ equates to $-\bar{s}_{7:4}$. A rearrangement of terms of equation 20 results in the following:

$$c_{7:5},0+(x_3Vy_3) \neq \bar{s}_{7:4}, \tag{21}$$

and $$c_{7:5},(x_3Vy_3) \neq \bar{s}_{7:4} \tag{22}$$

FIG. 3 implements Equation 22. Namely, the inverted sum outputs of adders 40 are compared with the carry outputs of adders 40(2)–(4) and the result of logically ORing $x_3$ with $y_3$, via XOR gates 52 when a logical zero is provided to note 30. If the corresponding bits do not equate then a logical one will be provided to output node 32 indicating an overflow condition.

As noted above, $c_{8:1}$ represents the carry bits of adding the first and second partial product operands $x_{7:0}$ and $y_{7:0}$. Equations 17 and 22 represent the operation of overflow detection 10 of FIG. 3 when first and second operands $a_{3:0}$ and $b_{3:0}$ are unsigned. With respect to operation of the overflow detection circuit of FIG. 3 when $a_{3:0}$ and $b_{3:0}$ represent signed operands, it is noted that one of ordinary skill in the art will recognize an overflow condition arises and a logical one will be generated at output node 32 when:

$$c_{7:4} \neq r_3,r_3,r_3,r_3 \tag{23}$$

A logical zero indicating a no overflow condition, will be reproduced at overflow output node 32 when each bit of $r_{7:4}$ equals $r_3$, the signed bit. It is well known in the art that zero and −1 are represented in two's complement as shown below:

$$0000=0 \tag{24}$$

$$111=-1 \tag{25}$$

Given Equations 24 and 25, it can be seen by one of ordinary skill in the art that Equation 23 reduces to:

$$r_{7:4} \neq -r_3 \tag{26}$$

As noted in Equation 5, $r_{7:4}$ can be represented as a function of $x_{7:4}$, $y_{7:4}$ and $c_4$. Equation 26 can be translated to:

$$x_{7:4}+y_{7:4}+c_4 \neq -r_3 \tag{27}$$

and $$x_{7:4}+y_{7:4}+c_4+r_3 \neq 0 \tag{28}$$

Presuming that $c_3$ equates to zero, Equations 7 and 8 above reduce to:

$$r_3=x_3 \oplus y_3, \tag{29}$$

and $$c_4=x_3y_3 \tag{30}$$

A two to two compression of $c_4$ and $r_3$ results in the following:

$$c_4+r_3=c_4r_3,c_4 \oplus r_3 \tag{31}$$

The concatenated terms resulting from the two to two compression of $c_4$ and $r_3$ results in the following:

$$c_4r_3=x_3y_3(x_3y_3 V x_3y_3)=0 \tag{32}$$

$$c_4 \oplus r_3=c_4r_3 V c_4r_3=x_3y_3(x_3 \oplus y_3)V(x_3Vy_3)(x_3 \oplus y_3) \tag{33}$$

$$c_4 \oplus r_3=x_3Vy_3 \tag{34}$$

Combining Equations 28 through 34 results in:

$$x_{7:4}+y_{7:4}-1+1+(x_3vy_3) \neq 0 \tag{35}$$

Again, the addition of the +1−1 to Equation 35 maintains consistency. Combining Equations 12 and 35 results in the following:

$$s_{7:4}+c_{7:5},0+1+(x_3vy_3) \neq 0 \tag{36}$$

Combining and concatenating terms of Equation 36 results in:

$$c_{7:5},(x_3vy_3) \neq \bar{s}_{7:4} \tag{37}$$

The overflow detection circuit 10 shown in FIG. 3 implements Equation 37. Namely, the inverted sum outputs of adders 42, are compared with the carry outputs of adders 42 (2)–(4) and the result of ORing $x_3$ and $y_3$, via XOR gates 54, when a logical one is provided to node 30. If the corresponding bits do not equate, a logical one is provided to overflow output node 32 indicating an overflow condition.

Equation 37 implements overflow detection when $c_3$ from adder 26 is a logical zero. If, on the other hand, $c_3$ is generated as a logical one by adder 26, then overflow detection circuit 10, operating in the signed mode, operates in accordance with the following equations. Namely, one of ordinary skill in the art will recognize that Equations 7 and 8 reduce to:

$$r_3=x_3 \oplus y_3 \tag{38}$$

$$c_4=x_3vy_3 \tag{39}$$

One of ordinary skill in the art will also recognize that $c_4$ and $r_3$ when subjected to a logical AND operation along with a logical XOR operation reduces to the following:

$$c_4r_3=x_3y_3 \tag{40}$$

$$c_4 \oplus r_3 = \overline{x_3 y_3} \quad (41)$$

A combination of Equations 40 and 41 with Equation 31 above, results in:

$$c_4 + r_3 = x_3 y_3, \overline{x_3 y_3} \quad (42)$$

Shown below is a truth table for $x_3$ logically ANDed with y3 and the representation of $x_3 y_3, \overline{x_3 y_3}$ in both binary and decimal form according to Equation 42 above.

TABLE

| $x_3 y_3$ | $x_3 y_3, \overline{x_3 y_3}$ | $x_3 y_3, \overline{x_3 y_3}$ (decimal) | (43) |
|---|---|---|---|
| 0 | 01 | 1 = 0 + 1 | |
| 1 | 10 | 2 = 1 + 1 | |

The true table reveals that the right side of Equation 42 reduces to:

$$x_3 y_3, \overline{x_3 y_3} = x_3 y_3 + 1 \quad (44)$$

Accordingly, the combination of Equations 28, 42, and 44 result in the following:

$$x_{7:4} + y_{7:4} + x_3 y_3 + 1 \neq 0 \quad (45)$$

A two to two compression of $x_{7:4}$ and $y_{7:4}$ produces:

$$x_{7:4} + y_{7:4} = s_{7:4} + c_{7:5}, 0 \quad (46)$$

Substituting Equation 46 into Equation 45 results in:

$$s'_{7:4} + c'_{7:5}, 0 + x_3 y_3 + 1 \neq 0 \quad (47)$$

A combination of Equations 46 and 47, and a rearrangement of terms thereof results in the following equation:

$$c'_{7:5}, x_3 y_3 \neq s'_{7:4} \quad (48)$$

The overflow detection circuit 10 of FIG. 3 implements Equation 48. In particular, when a logical one is inputted to signed/unsigned control node 30. A logical zero is provided to carry inputs of full adders 40. Full adders 40 implement a two to two compression of $x_{7:4}$ and $y_{7:4}$ thereby generating individual sum and carry bits. The sum bits are compared with the carry bits provided by full adders 40(2)–40(4) and the results of ANDing $x_3$ and $y_3$, via XOR gates 52. If the corresponding bits do not compare identically, a logical one is generated at OR gate 60 (3). The logical one is transferred to overflow detection output node 32 via multiplexer 64 when $c_3$ equals a logical one, thereby indicating that the first and second signed operands $a_{3:0}$ and $b_{3:0}$, when multiplied together, generate a product with overflow.

While the present invention has been described with reference to particular embodiments, it will be understood that the embodiments are illustrative and that the invention scope is not so limited. Variations, modifications, additions and improvements to the embodiment described are possible. These variations,, modifications, additions and improvements may fall within the scope of the invention as detailed in the following claims.

What is claimed is:

1. A circuit comprising:
   a multiplier circuit for multiplying first and second n bit operands, wherein the multiplier circuit is configured to generate a result operand which represents a multiplication of the first and second n bit operands and further configured to generate first and second 2n bit partial product operands, and;
   an overflow detection circuit coupled to the multiplier circuit and configured to generate an overflow signal indicating the multiplication of the first and second n bit operands result in an overflow condition, wherein the overflow detection circuit generates the overflow signal in parallel with the generation of the result operand by the multiplier circuit and wherein the overflow detection circuit is configured to receive the most significant (n+1) bits of the first and second 2n bit partial product operands from the multiplier circuit.

2. The circuit of claim 1, wherein the multiplier circuit comprises a compression circuit configured to generate the first and second 2n bit partial product operands as a function of the first and second n bit operands, wherein an addition of the first and second 2n bit partial product operands represent the result operand.

3. The circuit of claim 2 wherein the multiplier circuit further comprises a carry generation circuit configured to generate at least one carry bit representing a carry value of adding the (n−1) least significant bits of the first and second 2n bit partial product operands.

4. The circuit of claim 3 wherein the overflow detection circuit is configured to receive the at least one carry bit.

5. The circuit of claim 4 wherein the first and second n bit operands represent signed or unsigned operands.

6. The circuit of claim 5 wherein the overflow detection circuit is coupled to a control node, wherein the overflow detection circuit operates to generate the overflow condition signal when multiplying first and second n bit operands representing signed operands in response to the control node receiving a first control signal, and wherein the overflow detection circuit operates to generate the overflow condition signal when multiplying first and second n bit operands representing unsigned operands in response to the control node receiving a second control signal.

7. The circuit of claim 6 wherein the overflow detection circuit comprises a set of n full adders each having a sum output, a carry output, a first input, a second input, and third input, wherein the first inputs are configured to receive the n most significant bits of the first 2n bit partial product operand, the second inputs are configured to receive the n most significant bits of the second 2n bit partial product operand.

8. The circuit of claim 7 wherein the overflow detection circuit further comprises a first set of n inverters, each inverter being coupled between the control node and one of the third inputs of the full adders.

9. The circuit of claim 8 wherein the overflow detection circuit further comprises:
   a logic circuit having a pair of inputs and a pair of outputs;
   a multiplexer having an output, a pair of data inputs coupled to the outputs of the logic circuit, and a control input coupled to the control node;
   wherein the inputs of the logic circuit are configured to receive the (n+1)th most significant bits of the first and second 2n bit partial product operand.

10. The circuit of claim 9 wherein the logic circuit comprises an AND gate and an OR gate, wherein the AND gate has a pair of inputs configured to receive the (n+1)th most significant bits of the first and second 2n bit partial product operand and an output coupled to one of the data inputs of the multiplexer, and wherein the OR gate has a pair of inputs configured to receive the (n+1)th most significant bits of the first and second 2n bit partial product operand and an output coupled to another of the data inputs of the multiplexer.

11. The circuit of claim 10 wherein the overflow detection circuit further comprises a second set of n inverters and a comparator circuit having first and second inputs, wherein each inverter of the second set is coupled between a sum output of one of the n full adders and one of the first inputs of the comparator circuit, and wherein each second input of the comparator is coupled to one of the carry outputs of the n full adders and the output of the multiplexer.

12. The circuit of claim 11 wherein the comparator circuit comprises a set of XOR gates, wherein each XOR gate has a first and second input.

13. The circuit of claim 12 wherein the overflow detection circuit further comprises a second multiplexer having a pair of data inputs and a control input configured to receive the at least one carry bit, wherein one of the data inputs of the second multiplexer is coupled to an output of the comparator.

14. A method comprising the steps:

inputting first and second n bit operands to a multiplier;

generating first and second 2n partial product operands from the first and second n bit operands, wherein an addition of the first and second 2n bit partial product operands represents a result operand, and wherein the result operand represents a multiplication of the first and second n bit operands, and;

generating an overflow condition signal indicating the multiplication of the first and second n bit operands results in an overflow condition, wherein the overflow condition signal is generated in parallel with the generation of the result operand.

15. The method of claim 14 further comprising the steps:

generating at least one carry bit representing an addition of the (n−1) least significant bits of the first and second 2n bit partial product operands, and;

wherein the overflow condition signal is generated as a function of the (n+1) most significant bits of the first and second 2n bit partial product operands and the at least one carry bit.

16. The method of claim 15 further comprising the steps inputting the n most significant bits of the first and second 2n bit partial product operands into corresponding first and second inputs of a first set of n fall adders;

generating an n bit sum operand as a function of the n most significant bits of the first and second 2n bit partial product operands;

inverting the n bit sum operand;

generating an n bit carry operand as a function of n most significant bits of the first and second 2n bit partial product operands;

generating a one bit operand representing a logical operation of the (n+1)th most significant bits of the first and second 2n bit partial product operands;

comparing the inverted n bit sum operand with a concatenation of the (n−1) least significant bits of the n bit carry operand and the one bit operand;

wherein the overflow condition signal is generated when the inverted n bit sum operand is not equivalent to the concatenation of the (n−1) least significant bits of the n bit carry operand and the one bit operand.

17. The method of claim 16 further comprising the step of inputting a logical one or a logical zero into a third input of each of the first set of n full adders, wherein the logical one or the logical zero is inputted in parallel with the n most significant bits of the first and second 2n bit partial product.

18. The method of claim 15 wherein the step of generating the one bit operand comprises logically ORing the (n+1)th most significant bits of the first and second 2n bit partial product operands.

19. The method of claim 15 wherein the step of generating the one bit operand comprises logically ANDing the (n+1)th most significant bits of the first and second 2n bit partial product operands.

20. The method of claim 14, wherein said generating the overflow condition signal is done while generating the result operand from the addition of the first and second 2n bit partial product operands.

* * * * *